R. F. WALTER.
VEHICLE BRAKE.
APPLICATION FILED SEPT. 27, 1915.

1,204,097.

Patented Nov. 7, 1916.
2 SHEETS—SHEET 1.

Witness
Geo. Ackman Jr.

Inventor
Richard F. Walter
By
Edward H. ____
Attorney

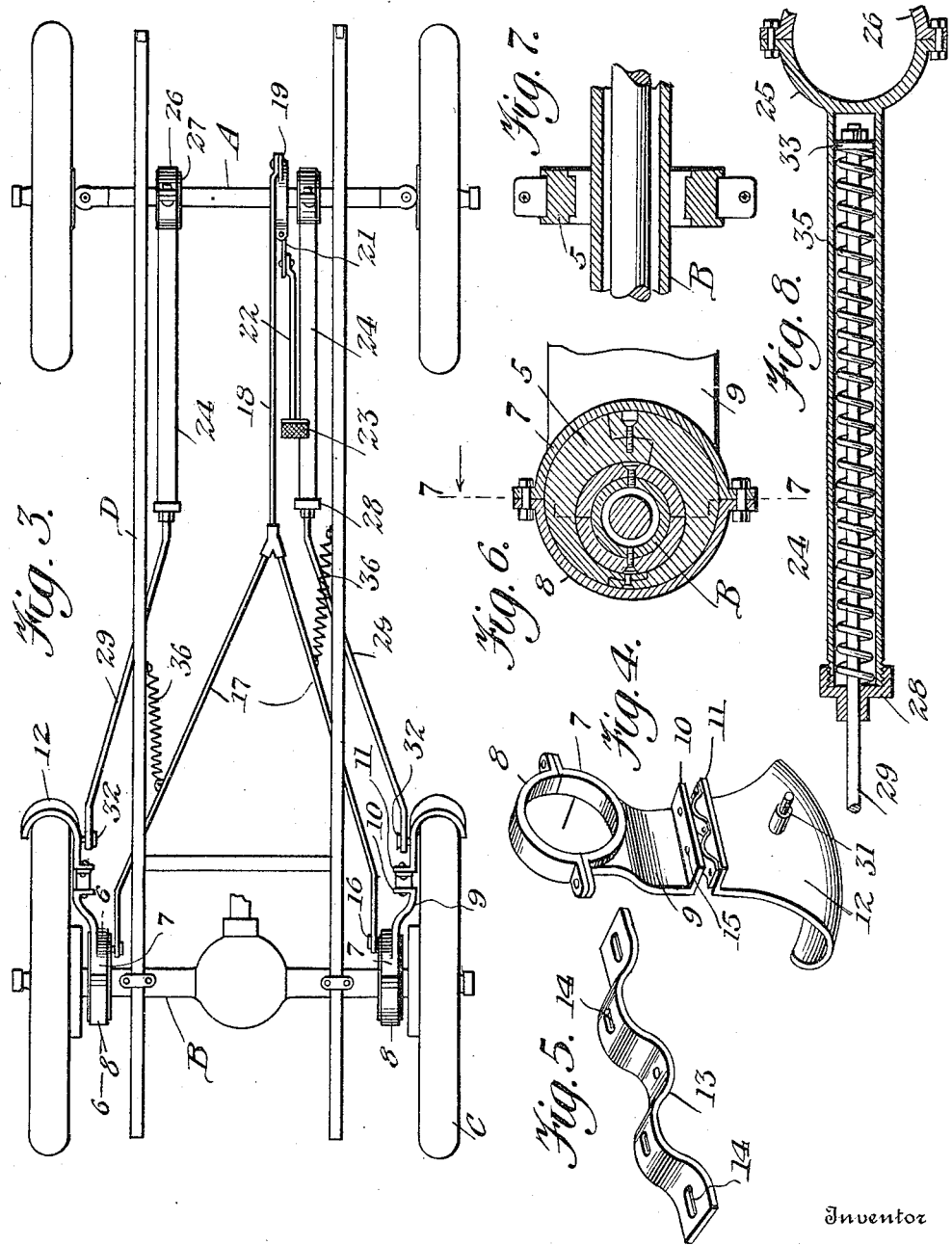

UNITED STATES PATENT OFFICE.

RICHARD F. WALTER, OF NEW YORK, N. Y.

VEHICLE-BRAKE.

1,204,097.  Specification of Letters Patent.  Patented Nov. 7, 1916.

Application filed September 27, 1915. Serial No. 52,933.

*To all whom it may concern:*

Be it known that I, RICHARD F. WALTER, a citizen of the United States of America, residing at New York, in the county of New York and State of New York, have invented certain new and useful Improvements in Vehicle-Brakes, of which the following is a specification.

This invention contemplates the provision of a vehicle brake embodying among other features a brake shoe normally disposed adjacent the periphery of the wheel, and adapted when moved into engagement therewith to be carried thereby into contact with the ground or surface, thus stopping the machine in short order, and preventing wear or burning of the rear tires incident to the skidding of the machine.

A further object of the invention resides in the provision of a brake of the above mentioned character, embodying means functionating in a two-fold capacity of a cushion for checking the movement of the shoe to active position, as well as automatically returning the shoe to normal position when released from the wheel.

Another important object of the invention resides in the provision of a brake shoe comprising yieldably connected sections, to permit the active section of the shoe to accommodate itself to the wheel upon application of the brake.

In carrying out my invention I aim to provide a brake consisting of a novel combination and arrangement of parts which produces a brake of maximum efficiency for the purposes intended, and one which can be easily and positively applied.

Other objects of the invention will appear as the nature of the same is better understood from the following description when considered in connection with the accompanying drawings, wherein like numerals of reference indicate similar parts in the several views and in which:—

Figure 1:
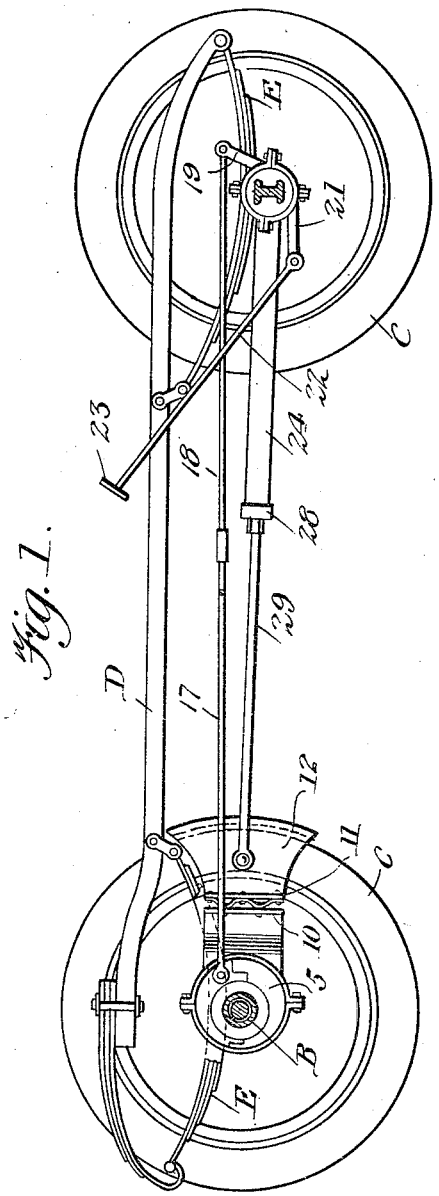
Figure 2:
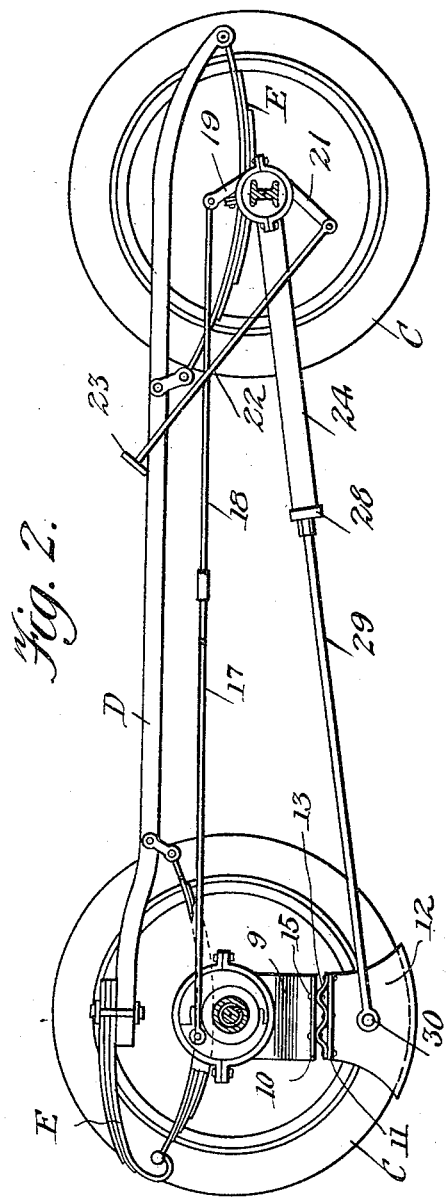

Figure 1 is a view showing the brake fitted upon a machine with the parts in normal position. Fig. 2 is a similar view showing the brake in its applied position. Fig. 3 is a top plan view. Fig. 4 is an enlarged detail view of the brake shoe. Fig. 5 is a detail view of the resilient connection between the shoe sections. Fig. 6 is a sectional view taken on line 6—6 of Fig. 3. Fig. 7 is a sectional view taken on line 7—7 of Fig. 6. Fig. 8 is a longitudinal sectional view through the spring casing showing the normal position of the parts therein.

Referring more particularly to the drawings, A and B indicate the front and rear axles of the vehicle, C the wheels, D the frame and E the springs for the latter. These parts may be of usual construction and are herein shown merely to illustrate more clearly the brake mechanism forming the subject matter of my invention.

Mounted for rotation upon the rear axle B, adjacent each wheel is an eccentric 5, and encircling each eccentric is a sectional band or strap, the sections 7 and 8 respectively of which may be secured together in any suitable manner. The section 7 of each band is formed to provide the innermost member of the brake shoe and is indicated at 9. This member terminates to provide an offset flange 10 disposed in spaced confronting relation with a similar flange 11 formed on the adjacent end of the outermost or active section 12 of the brake shoe. This section may be of any suitable design. Interposed between the flanges 10 and 11 respectively is a serpentine spring 13 forming a resilient connection between the sections of the brake shoe. The spring is provided with a plurality of elongated slots 14 through which are passed the rivets 15 for holding the spring operatively associated with the respective sections of the brake shoe, it of course being understood that the spring at its center is fixedly secured to the flange 11 of the active section 12. By reason of the resilient connection between the sections of the shoe, the latter is allowed to accommodate itself to the wheel upon application of the brake, the elongated slots 14 permitting the spring to be increased or decreased in length as the occasion may require, without any binding action between the parts.

Projecting from the innermost face of each of the eccentrics 5 is a headed stud 16 with which are connected the terminals of the branch portions 17 of the main operating rod 18. The branches 17 may be connected with the main portion 18 of the operating rod in any suitable manner. The foremost end of the main portion 18 of the operating rod is secured to the arm 19 of a bell crank lever 20, the latter being mounted upon the front axle A for rocking movement. Secured to the other arm 21 of the said bell crank lever is one end of the foot operated rod 22 by means of which the brake is applied, this rod being intended to extend up through the foot board of the machine and provided with a foot engaging member 23.

It will be manifest from the drawings that in the normal position of parts the active section 12 of the brake shoe is disposed in advance of the wheel and slightly spaced therefrom. Now when it is desired to apply the brakes, the foot operated rod 22 is depressed, imparting a rocking movement to the bell crank lever 20, which in turn by reason of its connection with the operating rod 18 moves the latter in a rearward direction, thereby rotating the eccentrics 5 upon the rear axle. This movement of the eccentrics 5 draws the active section 12 of the brake shoe into effective engagement with the rear wheels of the machine, whereupon through the frictional contact with the latter, the brake shoes are carried with the wheels into engagement with the ground or surface independently of the eccentrics 5, assuming the position clearly indicated in Fig. 2. It will thus be noted that the shoes being positioned between the tires and the ground, in addition to bringing the machine to a stop in short order, serve to prevent wear or burning of the rear tires incident to the skidding of the machine, which frequently occurs with all machines upon application of the brakes.

With a view of checking the movement of the brake shoe to active position, as well as providing a means for automatically returning the shoe to normal position when released from the wheel, I make use of a spring casing 24 which is formed at one end with the section 25 of a clamp, and with which the section 26 of the same clamp is adapted to be operatively associated and secured thereto in any suitable manner. This construction permits of this member to be readily and easily mounted upon the bearing member 27, which latter is secured to the front axle of the machine in any suitable manner. The opposite end of the casing is closed by means of a cap 28 which is provided with a restricted central bore for the reception of the rod 29, the latter having a portion slidably fitted within the casing, while the rear end of this rod is provided with an eye 30 adapted to receive a threaded stud 31 projecting from the active section 12 of the brake shoe. This stud has secured thereon a nut 32 which holds the rod 29 operatively associated with the brake shoe. That end of the rod 29 positioned within the casing 24 is formed with a collar or head 33 against which one end of a coiled extensile spring 35 is adapted to bear, this spring encircling the rod 29 and having its opposite end bearing against the cap 28. It might here be stated that the casing 24 is mounted upon the member 27 or the front axle A for slight rocking movements during the shifting of the shoe to active and inactive positions, and when the shoe is in applied position, the casing 24 and rod 29 assume the position clearly illustrated in Fig. 2. It is of course to be understood that the spring 35 possesses the requisite strength and tension to check the movement of the shoe when moved by the wheel to active position, and in so doing functionates in the capacity of a cushion to relieve the various parts of the brake mechanism of undue shock and strain incident to the application of the brake. It will be manifest that when the brake shoes are moved into engagement with the wheels and subsequently moved thereby into engagement with the ground, the rods 29 are moved rearwardly thereby contracting the springs 35 for the purposes hereinabove mentioned.

When it is desired to start the machine, the brake shoes are released by moving the machine a slight distance rearwardly off the active sections 12, whereupon the springs 35 instantly expand, thereby moving the rods 29 within the casing 24 which obviously returns the shoes automatically to their normal position as clearly shown in Fig. 1. The eccentrics 5, the operating rod 18, and the foot controlled rod 22 may all be automatically returned to normal position in any suitable manner, but I have shown in this specific instance the springs 36 connected to the frame D and the branches 17 of the operating rod, which springs operate to return the above mentioned parts to normal position when the foot controlled rod 22 is released. The brake mechanism is not only simple in its construction and very effective in operation, but consists of the novel combination and arrangement of elements with which all types of machines can be easily equipped without necessitating any alterations, or modifying the construction of the machine in any respect.

While it is believed that from the foregoing description the nature and advantages of the invention will be readily apparent, I desire to have it understood that I do not limit myself to the precise construction and arrangement of parts herein shown and described, as the same is merely illustrative of what I consider one embodiment of the invention, and various changes may be resorted to when desired as fall within the scope of what is claimed.

What is claimed is:—

1. A vehicle brake comprising a brake shoe normally disposed adjacent the periphery of the wheel and comprising a plurality of spaced sections, means for moving the shoe into engagement with the wheel, a serpentine spring interposed between said sections and providing a yieldable connection therebetween to allow the shoe to accommodate itself to the wheel upon its application thereto.

2. A vehicle brake comprising in combination an eccentric loosely mounted upon the rear axle of the vehicle, a brake shoe associated with said eccentric and adapted to be moved thereby into frictional engagement with the wheel, said shoe being thereby adapted to be carried by said wheel into contact with the ground to active position independently of said eccentric, and means for checking the movement of said shoe to active position, and adapted to return said shoe to normal position.

3. A vehicle brake comprising a brake shoe normally disposed adjacent the periphery of the wheel, means for moving said shoe into engagement therewith, including a bell crank lever mounted upon the front axle of the vehicle for rocking movement, an operating rod connected with said shoe and one branch of the bell crank lever, a foot operated rod connected with the other branch of said lever for operating the latter, and means for returning said shoe to normal position.

4. A vehicle brake comprising a brake shoe normally disposed adjacent the periphery of the wheel, means for moving said shoe into engagement therewith, means for checking the movement of said shoe to active position including a casing normally disposed in horizontal position and having one end journaled upon the front axle of the machine, a rod connected with the shoe and slidably fitted within said casing and adapted to move said casing to an inclined position upon movement of the shoe to active position, a spring encircling said rod and arranged within the casing, said spring normally extending throughout the major portion of the length of the casing and adapted to automatically return the shoe and casing to normal position.

5. A vehicle brake comprising a brake shoe normally disposed adjacent the periphery of the wheel and consisting of a plurality of spaced sections, flanges formed on the adjacent ends of said sections and disposed in confronting relation, and a yieldable connection between said flanges to allow the shoe to accommodate itself to the wheel upon its application thereto.

In testimony whereof I have hereunto set my hand in presence of two subscribing witnesses.

RICHARD F. WALTER.

Witnesses:
PATRICK J. RATIGAN,
PETER G. ARNOT.

Copies of this patent may be obtained for five cents each, by addressing the "Commissioner of Patents, Washington, D. C."